US007850177B2

(12) United States Patent
Gilhuly (10) Patent No.: US 7,850,177 B2
(45) Date of Patent: Dec. 14, 2010

(54) STROLLER PLATFORMS

(76) Inventor: Terence Gilhuly, 815 East 21st Ave, Vancouver, BC (CA) V5V1S3

( * ) Notice: Subject to any disclaimer, the term of this patent is extended or adjusted under 35 U.S.C. 154(b) by 326 days.

(21) Appl. No.: 12/131,107

(22) Filed: Jun. 1, 2008

(65) Prior Publication Data

US 2008/0296879 A1   Dec. 4, 2008

Related U.S. Application Data (60) Provisional application No. 60/941,598, filed on Jun. 1, 2007, provisional application No. 60/974,661, filed on Sep. 24, 2007.

(51) Int. Cl.
*B62B 5/08* (2006.01)
(52) U.S. Cl. .................. 280/47.35; 280/47.19
(58) Field of Classification Search ............ 280/2, 280/63, 75, 76, 77, 32.7, 33.992, 33.993, 280/47.38, 304.5, 656, 304.1, 769, 288.4, 280/495, 47.4, 657, 658, DIG. 3, 47.19, 47.35; 172/433; 211/86.01; 248/210; 297/463.1, 297/463.2; 108/44
See application file for complete search history.

(56) References Cited

U.S. PATENT DOCUMENTS

| | | | | | |
|---|---|---|---|---|---|
| 1,245,958 A | * | 11/1917 | O'Connor | .................. | 248/210 |
| 1,563,055 A | * | 11/1925 | Whallon | .................. | 224/502 |
| 1,666,293 A | * | 4/1928 | Lorton | .................. | 211/86.01 |
| 2,293,275 A | * | 8/1942 | Boltz | .................. | 211/86.01 |
| 2,444,876 A | * | 7/1948 | Kuhl | .................. | 280/495 |
| 2,781,201 A | * | 2/1957 | Tremblay | .................. | 280/30 |
| 2,818,316 A | * | 12/1957 | D'Andrade | .................. | 220/482 |
| 2,837,306 A | * | 6/1958 | Elm | .................. | 248/210 |
| 2,839,201 A | * | 6/1958 | Auster | .................. | 211/86.01 |
| 2,864,189 A | * | 12/1958 | Campbell | .................. | 40/308 |
| 2,888,761 A | * | 6/1959 | Miller | .................. | 40/308 |
| 3,019,953 A | * | 2/1962 | Umanoff | .................. | 224/411 |
| 3,111,297 A | * | 11/1963 | Conner | .................. | 108/147.18 |
| 3,226,074 A | * | 12/1965 | Coe | .................. | 248/311.2 |
| 3,465,893 A | * | 9/1969 | Kinney | .................. | 211/86.01 |
| 3,515,429 A | * | 6/1970 | Bollinger | .................. | 297/153 |
| 3,584,821 A | * | 6/1971 | Glebe | .................. | 248/156 |
| 3,593,951 A | * | 7/1971 | Warner et al. | .................. | 248/210 |
| 3,822,847 A | * | 7/1974 | Emmons | .................. | 248/210 |
| 3,916,608 A | * | 11/1975 | Garrison | .................. | 56/202 |
| 3,934,895 A | * | 1/1976 | Fox | .................. | 280/47.26 |
| 3,976,155 A | * | 8/1976 | Esch | .................. | 280/32.5 |
| 3,998,416 A | * | 12/1976 | Benolkin | .................. | 248/210 |
| 4,124,094 A | * | 11/1978 | Cande | .................. | 182/187 |
| 4,222,541 A | * | 9/1980 | Cillis | .................. | 248/210 |
| 4,364,699 A | * | 12/1982 | Koppes | .................. | 414/9 |
| 4,383,669 A | * | 5/1983 | Rasler | .................. | 248/210 |
| 4,405,046 A | * | 9/1983 | Schultz et al. | .................. | 206/557 |
| 4,449,750 A | * | 5/1984 | Pultman | .................. | 312/235.2 |
| 4,512,607 A | * | 4/1985 | Rapp | .................. | 297/153 |
| 4,526,419 A | * | 7/1985 | Bowman et al. | .................. | 297/153 |
| 4,527,763 A | * | 7/1985 | Woytowich | .................. | 248/238 |
| 4,555,124 A | * | 11/1985 | Millington | .................. | 280/304.1 |
| 4,593,929 A | * | 6/1986 | Williams | .................. | 280/650 |
| 4,632,451 A | * | 12/1986 | Lee | .................. | 297/153 |
| 4,659,099 A | * | 4/1987 | Malone | .................. | 280/304.1 |
| 4,667,489 A | * | 5/1987 | Seitz et al. | .................. | 66/168 |

(Continued)

*Primary Examiner*—J. Allen Shriver, II
*Assistant Examiner*—Brodie Follman (57) ABSTRACT

In this patent, mechanically simple and inexpensive to produce platforms for modification of a stroller such that an additional child or a pet or a package may be transported are taught.

6 Claims, 8 Drawing Sheets

U.S. PATENT DOCUMENTS

| | | | | |
|---|---|---|---|---|
| 4,679,818 A * | 7/1987 | Kakavas | ............... | 280/33.992 |
| 4,696,420 A * | 9/1987 | Kulik | ............... | 224/275 |
| 4,779,884 A * | 10/1988 | Minati | ............... | 280/304.1 |
| 4,828,151 A * | 5/1989 | Goss | ............... | 224/438 |
| 4,915,035 A * | 4/1990 | Clark et al. | ............... | 108/44 |
| 4,923,208 A * | 5/1990 | Takahashi et al. | ............... | 280/642 |
| 4,953,887 A * | 9/1990 | Takahashi et al. | ............... | 280/647 |
| 5,060,960 A * | 10/1991 | Branscumb et al. | ............... | 280/250.1 |
| 5,261,682 A * | 11/1993 | Chuang | ............... | 280/42 |
| 5,316,105 A * | 5/1994 | Reggin et al. | ............... | 182/187 |
| 5,340,140 A * | 8/1994 | Bynum | ............... | 280/304.1 |
| 5,382,074 A * | 1/1995 | Pietra | ............... | 297/153 |
| 5,421,548 A * | 6/1995 | Bennett et al. | ............... | 248/129 |
| 5,425,546 A * | 6/1995 | Gerber et al. | ............... | 280/33.992 |
| 5,458,354 A * | 10/1995 | Bone | ............... | 280/304.1 |
| 5,464,183 A * | 11/1995 | McConnell et al. | ............... | 248/311.2 |
| 5,538,432 A * | 7/1996 | Dondero et al. | ............... | 434/258 |
| 5,588,663 A * | 12/1996 | Rundle et al. | ............... | 280/304.1 |
| 5,653,460 A * | 8/1997 | Fogarty | ............... | 280/642 |
| 5,662,047 A * | 9/1997 | Metcalf | ............... | 108/44 |
| 5,664,798 A * | 9/1997 | Huang | ............... | 280/642 |
| 5,667,272 A * | 9/1997 | Sutton | ............... | 297/140 |
| 5,678,741 A * | 10/1997 | Schieber | ............... | 224/275 |
| 5,743,650 A * | 4/1998 | Shannon et al. | ............... | 383/16 |
| 5,749,305 A * | 5/1998 | Jacovelli | ............... | 108/44 |
| 5,749,306 A * | 5/1998 | Breuner | ............... | 108/44 |
| 5,758,889 A * | 6/1998 | Ledakis | ............... | 280/47.38 |
| 5,813,582 A * | 9/1998 | Wright | ............... | 224/407 |
| 5,823,548 A * | 10/1998 | Reiland et al. | ............... | 280/33.993 |
| D403,280 S * | 12/1998 | Diestel et al. | ............... | D12/133 |
| 5,842,745 A * | 12/1998 | Kelly et al. | ............... | 297/411.23 |
| 5,860,664 A * | 1/1999 | Smith | ............... | 280/250.1 |
| 5,865,409 A * | 2/1999 | Nimer | ............... | 248/210 |
| 5,918,891 A * | 7/1999 | Russell | ............... | 280/33.991 |
| 5,938,091 A * | 8/1999 | Bergin et al. | ............... | 224/411 |
| 6,022,031 A * | 2/2000 | Reiland et al. | ............... | 280/33.993 |
| 6,036,158 A * | 3/2000 | Raasch | ............... | 248/441.1 |
| 6,182,529 B1 * | 2/2001 | White | ............... | 74/551.1 |
| 6,186,528 B1 * | 2/2001 | Walker et al. | ............... | 280/204 |
| 6,240,857 B1 * | 6/2001 | Elizer | ............... | 108/152 |
| 6,250,451 B1 * | 6/2001 | Thirkill | ............... | 194/205 |
| 6,340,168 B1 * | 1/2002 | Woleen | ............... | 280/643 |
| 6,443,252 B1 * | 9/2002 | Andes | ............... | 180/65.1 |
| 6,464,238 B2 * | 10/2002 | Reiland et al. | ............... | 280/33.993 |
| 6,530,591 B2 * | 3/2003 | Huang | ............... | 280/650 |
| 6,572,122 B2 * | 6/2003 | Johnson et al. | ............... | 280/33.993 |
| 6,575,480 B2 * | 6/2003 | McKelvey | ............... | 280/33.993 |
| 6,585,284 B2 * | 7/2003 | Sweeney et al. | ............... | 280/650 |
| 6,592,084 B1 * | 7/2003 | Nile | ............... | 248/104 |
| 6,595,474 B2 * | 7/2003 | Nicholson | ............... | 248/118 |
| 6,604,472 B2 * | 8/2003 | McNeil | ............... | 108/42 |
| 6,722,469 B1 * | 4/2004 | Weger, Jr. | ............... | 182/107 |
| 6,722,681 B1 * | 4/2004 | Large | ............... | 280/304.1 |
| 6,766,930 B2 * | 7/2004 | Dixon et al. | ............... | 224/409 |
| 6,773,073 B1 * | 8/2004 | Escobedo | ............... | 297/423.34 |
| 6,851,693 B2 * | 2/2005 | Haeggberg | ............... | 280/204 |
| 6,944,981 B1 * | 9/2005 | Garberg et al. | ............... | 40/308 |
| 6,986,404 B1 * | 1/2006 | Laborde | ............... | 182/135 |
| 7,195,155 B2 * | 3/2007 | Garberg et al. | ............... | 235/383 |
| 7,438,363 B1 * | 10/2008 | Sutherland | ............... | 297/463.1 |
| 7,500,645 B1 * | 3/2009 | McCubbins | ............... | 248/210 |
| 7,513,470 B2 * | 4/2009 | Lomberk | ............... | 248/177.1 |
| 7,597,332 B2 * | 10/2009 | Thompson | ............... | 280/47.38 |
| 7,641,217 B2 * | 1/2010 | Yoo et al. | ............... | 280/646 |
| 7,677,583 B2 * | 3/2010 | Armstrong et al. | ............... | 280/163 |
| 7,726,445 B2 * | 6/2010 | Parnell | ............... | 182/82 |
| 2001/0013688 A1 * | 8/2001 | Warner et al. | ............... | 280/47.38 |
| 2001/0033069 A1 * | 10/2001 | Ivers | ............... | 280/648 |
| 2002/0067026 A1 * | 6/2002 | Hsia | ............... | 280/647 |
| 2002/0185576 A1 * | 12/2002 | Harper | ............... | 248/210 |
| 2006/0226635 A1 * | 10/2006 | Huang | ............... | 280/642 |
| 2007/0114738 A1 * | 5/2007 | Jones et al. | ............... | 280/32.7 |
| 2007/0114755 A1 * | 5/2007 | Pasternak et al. | ............... | 280/304.1 |
| 2007/0119348 A1 * | 5/2007 | Evans | ............... | 108/44 |
| 2007/0120398 A1 * | 5/2007 | Butler | ............... | 297/153 |
| 2007/0273113 A1 * | 11/2007 | Muir | ............... | 280/33.992 |
| 2008/0001370 A1 * | 1/2008 | Cousin | ............... | 280/32.7 |
| 2008/0041282 A1 * | 2/2008 | Goschy et al. | ............... | 108/141 |
| 2008/0088115 A1 * | 4/2008 | Yang et al. | ............... | 280/642 |
| 2008/0129097 A1 * | 6/2008 | Kowal et al. | ............... | 297/284.4 |
| 2008/0169620 A1 * | 7/2008 | Pierce | ............... | 280/33.993 |
| 2008/0224432 A1 * | 9/2008 | Lundh | ............... | 280/47.38 |
| 2008/0240897 A1 * | 10/2008 | Miro et al. | ............... | 414/462 |
| 2009/0001689 A1 * | 1/2009 | Swenson | ............... | 280/304.1 |
| 2009/0084924 A1 * | 4/2009 | Schuermann et al. | ............... | 248/452 |
| 2010/0109270 A1 * | 5/2010 | Hei et al. | ............... | 280/47.35 |

* cited by examiner

STROLLER PLATFORMS

CROSS-REFERENCE TO RELATED APPLICATIONS

The present application claims priority from U.S. provisional patent application No. Ser. No.: 60/941,598, filed Jun. 1, 2007, and from U.S. provisional patent application No. 60/974,661, filed Sep. 24, 2007, which are incorporated herein by reference in their entirety and for all their teachings and disclosures.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Single child strollers are built and sold with the intention of conveying a single child in a seated position. Families or childcare givers that start with a stroller for one child only and then have a second child are faced with a problem of only being able to seat one of the children should they need to transport both. Similarly for families and childcare givers with multiple children, they face the dilemma of how to transport an additional child should it arrive.

Solutions available to the parents and childcare givers include: obtaining a second stroller; obtaining a larger stroller to seat the extra child (a double or triple stroller); having one child walk or be carried; or obtain a wheeled device that attaches to the back of the stroller upon which the additional child can stand. Examples of the wheeled devices include the Bugaboo Wheeled Board and the Lascal Buggy Board.

The mentioned solutions are not ideal. Obtaining a second stroller is expensive and excessive in terms of new materials required. As well, a second adult is now required whenever the additional child needs to be transported. Double and triple strollers are also expensive and excessive, and furthermore have reduced maneuverability. The size of the stroller can prevent access to various locations: reduced turning radius can limit steering and turning about in cramped places such as shopping aisles; increased width can prevent traversing doorways. Having the additional child walk and/or be carried can be tiring for the additional child and/or parent and can limit the distance that the family or group can travel. Finally, wheeled devices for attachment to the stroller to allow a standing child can be obtrusive for the parent pushing the stroller by disrupting their natural stride, and can limit vision for the child standing as the child may not be able to see over the stroller if the child is not tall. Although not as expensive as a new stroller, these devices involve specialized parts including linkages, casters and bearings, the wheeled devices can be relatively expensive compared to what could be spent to build a similar performing device such as the device of this invention.

It is the objective of this invention to provide transportation for an additional child with the original stroller (single stroller for two children, double stroller for three, and so on) that solves the above-mentioned problems of inconvenience, excess and expense. For strollers in which there is an under-riding basket (for storage of toys, clothes, groceries and other things) or another similar structure capable of supporting a platform structure and a standing child, a platform is disclosed that allows the modification of a stroller for carrying an additional child in a standing position.

PATENT DOCUMENTS

See U.S. Pat. Nos. 6,827,356, 6,698,772, 6,422,634, 6,371, 498, 5,882,022, 5,361,454, 5,312,122, D428367, and applications 2003/0025304 and 2006/0290081.

OTHER PRIOR ART

Bugaboo Wheeled Board and Lascal Buggy Board product literature.

BRIEF SUMMARY OF THE INVENTION

Devices to modify a baby carriage, pram or child's stroller (herein 'stroller') for the conveyance of an additional child are described. Although the application is written with the outlook of transporting a child, it could also be used to transport a pet, a package or other such object.

This invention comprises a main body and constraining mechanism. The main body can act as a platform for standing on by a child. The constraining mechanism couples the invention to the stroller and can limit motion of the invention relative to the stroller. The platform gains support for the weight of the child from positioning the main body in such a way that it the child's weight is transferred to one or more members of the stroller's frame. The platform is intended to support the weight of the child and provide safe transportation for that child.

The invention is intended to be of simple construction and thereby easily manufactured and inexpensive to produce and sell. The invention can comprise as few parts as a single piece that can be CNC machined; cast; injection, spin or blow molded; vacuum formed; or manufactured in another inexpensive, mass production fashion. The few parts can allow for ease of removal when the platform is not required.

In use, the child can stand on the platform and hold onto the back of the stroller and/or the handles of the stroller used for pushing the stroller. This places the child in a position from where they can see without viewing obscured by the stroller, increasing the child's acceptance and enjoyment of this mode of transport. The length of the stroller footprint is not changed; i.e. the size of the stroller's footprint is not lengthened by the placement of the child between the stroller pusher and the stroller. Thereby, pushing the stroller is not interfered with and not made inconvenient to the stroller pusher or otherwise user; the stroller is not kicked or tripped on by users.

The invention further comprises adaptive mechanisms to provide universal adaptation to most stroller types. These adaptive mechanisms include hinges and sliders to permit reach over distances and adjustment for angles of different stroller types. Furthermore these hinges can permit freer access to contents of containers associated with the stroller, without having to remove the stroller platform.

DETAILED DESCRIPTION OF THE INVENTION

The invention relates to a platform for a stroller to allow a child to be conveyed such that they can stand. Again, the invention could also convey a pet, package or other such object, not necessarily standing. This platform is comprised of a main body upon which the child can stand and a mechanism for removably attaching the main body to the stroller. Support for the child, pet or package's weight is provided by members of the stroller's frame, in a preferred instance by elements of an underbasket.

Figure 1:
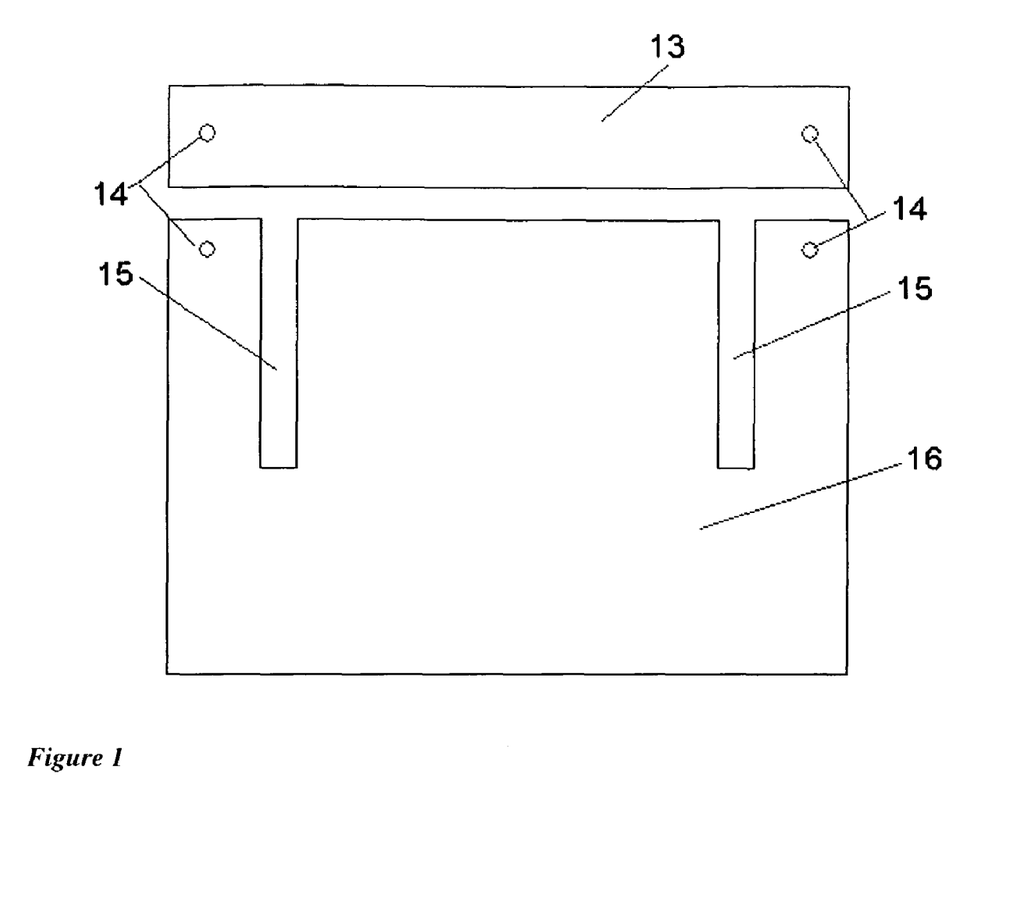
FIG. 1 shows the invention in an exploded top-view.

As drawn in FIG. 1, the attaching mechanism can be a crosspiece 13 with one or more joints 14 between crosspiece 13 and main body 16 to allow engagement with main body 16. As drawn in FIG. 1, crosspiece can be a flat material such as wood or plastic. Crosspiece 13 can also be a simple bar with a suitable joining means such as brackets or loops fixed to main body 16. The platform main body 16 is positioned over and rests on a cross member of the stroller as a cantilever extending towards the person pushing the stroller. There are at least three points of contact between the stroller and the platform to reduce unwanted motion of the platform relative to the stroller. The area of contact is preferably a flat line or rectangle to prevent roll of the platform relative to the stroller. To prevent pitch rotation of the main body 16, crosspiece 13 engages the stroller below structural members running lengthwise along the stroller and joins main body 16 at joint 14. Yaw rotation is limited by engagement of the platform with descending pieces of the stroller frame (stroller frame 11 in FIG. 2), passing through platform slot 15.

Crosspiece 13 and/or main body 16 can have one or more posts and the other can have one or more mating holes to connect at joint 14 and to temporarily or permanently fix main body 16 and crosspiece 13 together. Exemplary mechanisms for implementing joint 14 include a pin joint, where one or both of main body 16 and crosspiece 13 have a post and the other has a mating hole; a screw or bolt joint where one or more screws or bolts penetrate through either or both of main body 16 and crosspiece 13, and receiving nuts are located either integral to main body 16 using an overmolding process for example or external to main body 16; and an adhesive joint.

Figure 2:
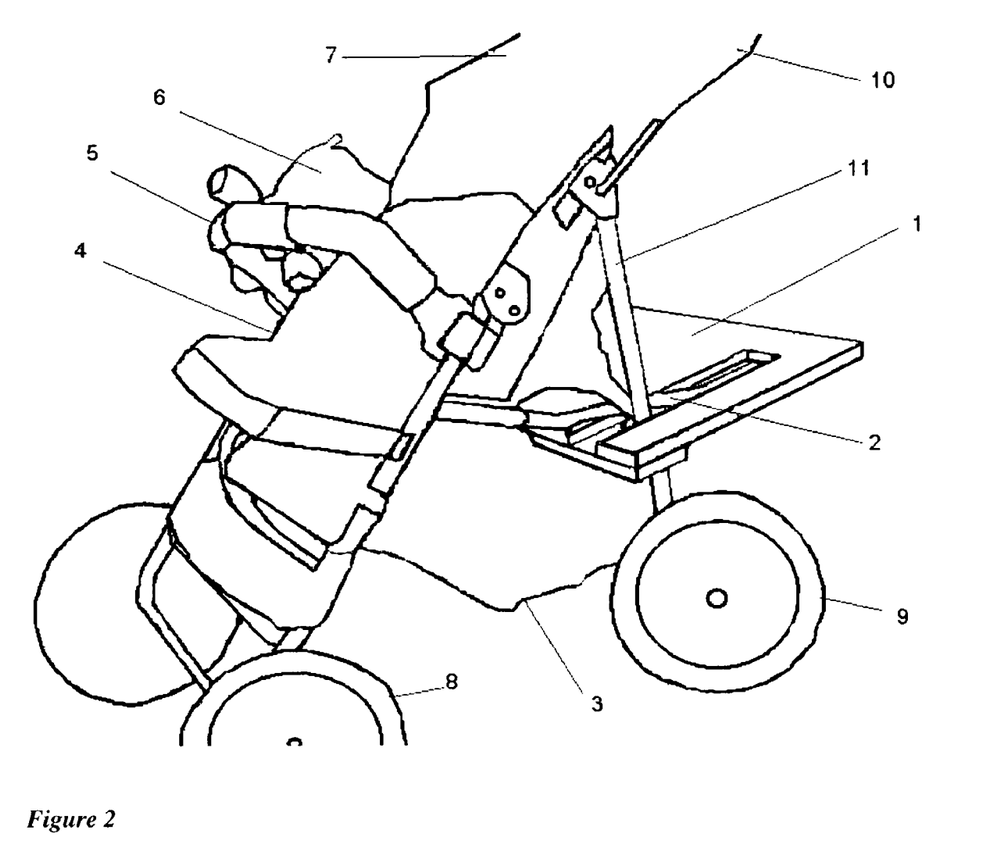
FIG. 2 shows the invention integrated with a stroller.

FIG. 2 shows the invention integrated with a stroller. The stroller is composed of a frame 11, mounted to which are front wheels 8 and rear wheels 9, underbasket 3 supported by underbasket frame 2, child seat 4 with restraining bar 5 and entertainment toy 6, wind and rain screen 7, pushing handle 10 and breaking mechanism 12. Platform 1 is seen at the back of the stroller above rear wheel 9, being held in place by its arrangement with underbasket frame 2 and stroller frame 11.

Figure 3:
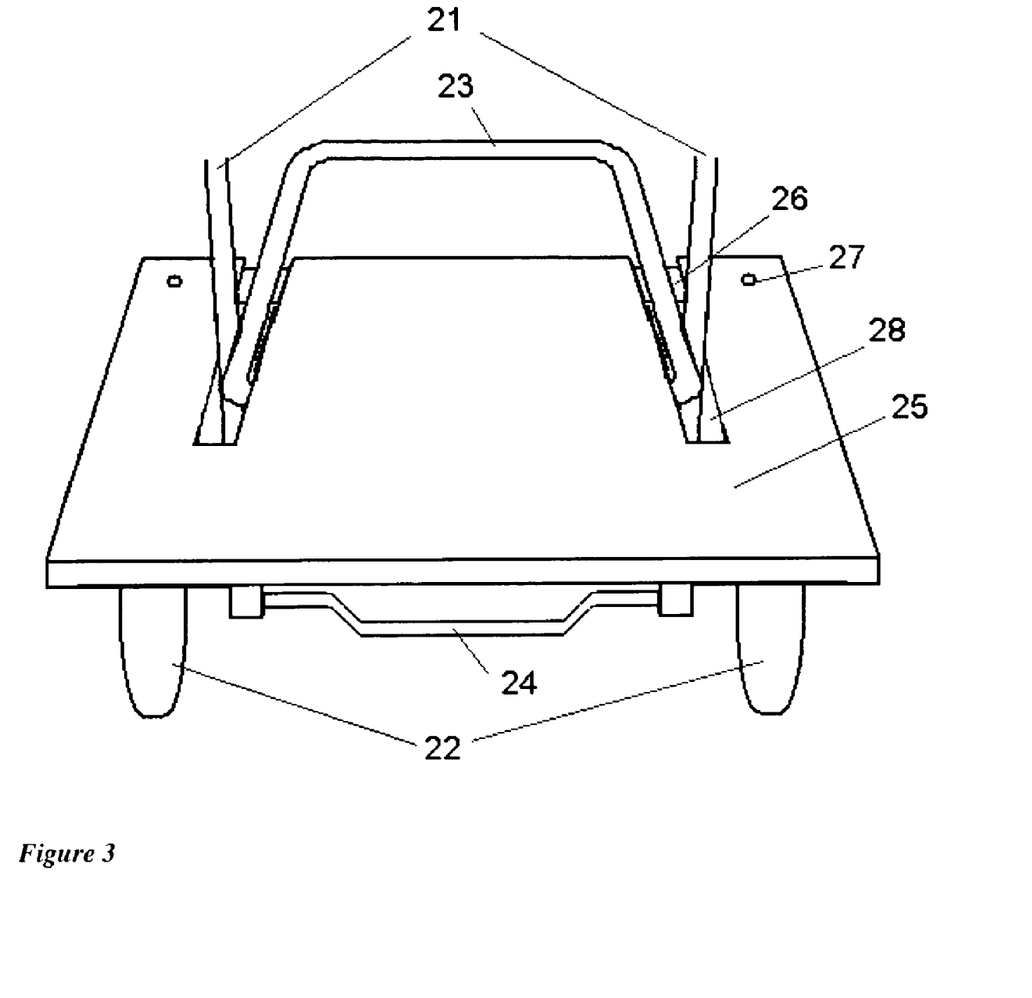
FIG. 3 is a simplified view to better display the invention in relationship to the stroller.

FIG. 3 is a simplified rear view of the stroller and platform combination, to better display the invention in relationship to the stroller. The stroller is represented in a cutaway view showing the rear wheels 22, frame 21, underbasket frame 23 and braking mechanism 24. The platform is composed of main body 25 and crosspiece 26, connected by joint 27. In a preferred instantiation of the invention, the platform engages with the stroller by resting on underbasket frame 23 and by encircling surrounding members of frame 21 forming the rear of the stroller and possibly descending from the pushing handle (pushing handle 10 in FIG. 2) towards rear wheels 22. Surrounding frame 21 prevents lateral motion of the platform. In the design of FIG. 3, platform slot 28 can be made optional.

A somewhat loose fit of the platform to the members of the stroller will allow better access to the contents of the underbasket (underbasket 3 in FIG. 2) and give one platform the ability to fit many different models of strollers, ie. strollers of differing dimensions, particularly in the spacing of the members of the frame captured by the stroller platform.

Figure 4:
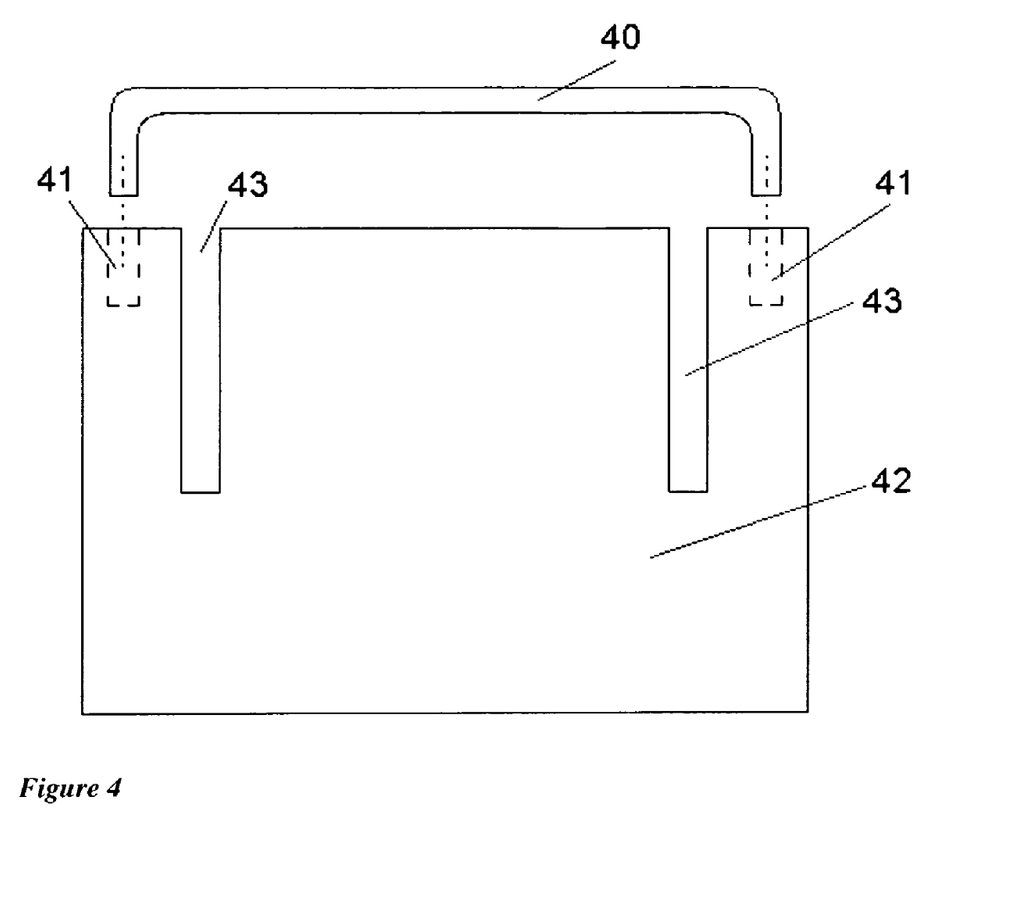
FIG. 4 shows the invention in an exploded top-view where the crosspiece has been replaced by a tubular member that mounts into the thickness of the main body of the platform.

In another instantiation of the invention, other mechanisms are available to adapt the platform to fit to the stroller. FIG. 4 shows an instantiation where u-shaped crosspiece 40 mates with joining holes 41 on the edge of main body 42. Joining holes 41 are indicated by broken lines in the diagram, because the joining holes 41 have been made internal to main body 42 in this depiction. Other means of removably attaching u-shaped crosspiece 40 external to main body 42 including use of loops or hooks are also possible. In the design of FIG. 4, platform slot 43 can be made optional. An exemplary instantiation of u-shaped crosspiece 40 includes bent tubular bars that interface with joining holes in the vertical edge of main body 42. U-shaped crosspiece 40 can be maintained in the joining holes 41 through mechanisms including use of a friction fit, o-rings gripping u-shaped crosspiece 40 internal to main body 42, a ball and socket joint, and a key and lock locking mechanism.

Crosspiece 40 in FIG. 4 and crosspiece 13 in FIG. 1 can also be substituted for by the use of suitably tensioned chains, belts, straps or ropes.

Figure 5:
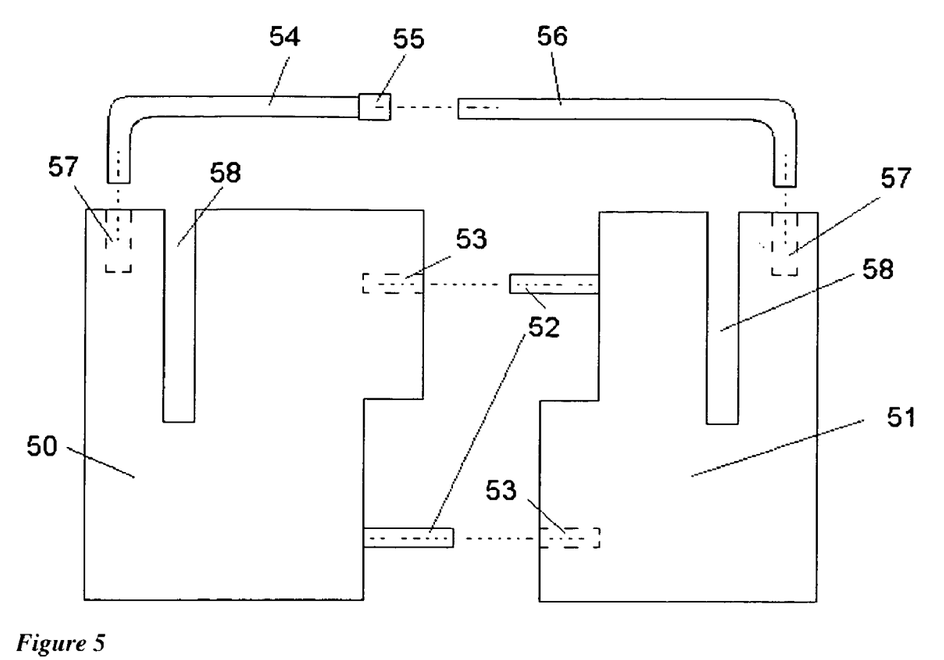
FIG. 5 shows the invention in an exploded top-view where the invention has been made adjustable to fit varying sizes of strollers.

Another instantiation of the invention where the invention includes a mechanism for to allow adaptation to different types of strollers with variation in spacing distances of the members of the stroller frame is shown in FIG. 5. The main body can be constructed as main body left side 50 and main body right side 51, where main body left side 50 and main body right side 51 can join as a peg and hole fit with one or more pegs 52 inserted a varying depth into one or more holes 53 (indicated with broken lines denoting holes hidden from the view penetrating main body left side 50 and right side 51). The depth of the penetration of the pegs 52 into holes 53 depends on the spacing of members of the stroller frame. To prevent motion of main body left side 50 and main body right side 51 while in use, the peg and hold fit can further comprise mechanisms of resisting motion including friction fits, quick-release clamps and locking mechanisms. Either or both of main body left side 50 and main body right side 51 can have overlapping material, to close any gap that may occur if main body left side 50 and right side 51 are sufficiently spaced apart, to provide a complete and continuous platform.

Similarly, to adapt to different sized strollers, the crosspiece for capturing the members of the stroller frame is made expandable for the instantiation of FIG. 5. The crosspiece can be made up of crosspiece left half 54, crosspiece right half 56 and an optional crosspiece joining piece 55. To allow reduction in overall width and to tighten the crosspiece assembly (54, 55 and 56), crosspiece right half 56 can slide interiorly into or exteriorly over crosspiece left half 54. Without crosspiece joining piece 55, the fit of crosspiece left half 54 and crosspiece right half 56 can be made tight to reduce sliding tendency. With crosspiece joining piece 55, the fit of crosspiece left half 54 and crosspiece right half 56 can comprise a means of reducing motion of the two pieces relative to each other partially such as by a frictional fit due to light gripping, light contact or by a small clearance between the inner and outer diameters of the interconnecting pieces, or by use of rubber seals and/or o-rings. Crosspiece joining piece 55 can otherwise comprise a locking feature where crosspiece joining piece is a collar rotatably fixed on one of crosspiece left half 54 or crosspiece right half 56, and the other of crosspiece left half 54 or crosspiece right half 56 further comprises threading to receive crosspiece joining piece 55.

Figure 6:
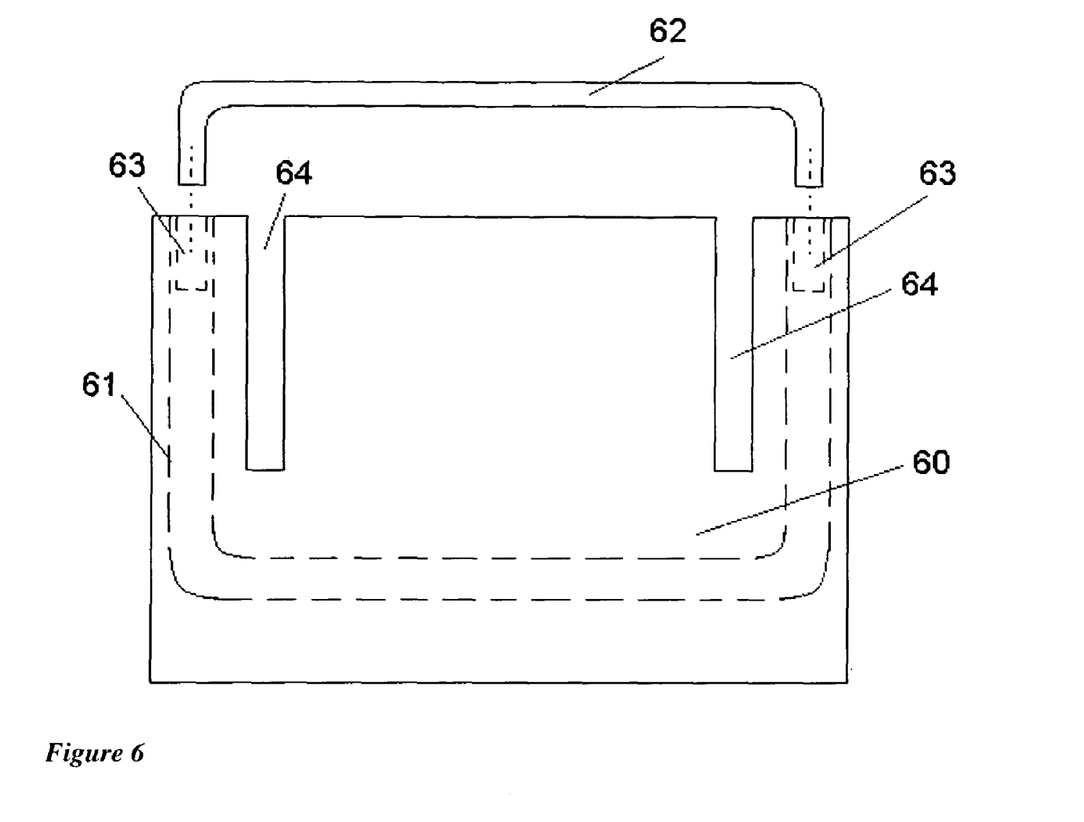
FIG. 6 shows the invention in an exploded top-view where the platform further comprises an internal reinforcement bar.

FIG. 6 shows another instantiation where, to reinforce the platform, structural members including bars and/or pipe of stronger material than that of the main body 60 are incorporated into main body 60. In the figure, reinforcement member 61 (drawn in dotted line to indicate its incorporation into main body 60) has been incorporated into main body 60 and is used to receive crosspiece 62 at the top of its "u" shape. Adhesives, press fitting, fasteners, overmolding or a similar process are exemplary ways in which the reinforcement material can be added.

In the figures, the platforms and crosspieces have been depicted with square corners. In another instantiation the corners can be rounded as a safety feature.

The invention can further comprise one or more slip resistant surfaces. These surfaces can be patterns (e.g. grooves) formed (by molding or a secondary process such as cutting, for example) into the surface of the platform's component parts and can also comprise another material bonded, molded into or otherwise attached to the platform.

In another preferred instantiation of the invention, the platform of the invention can be made with a mechanism for attaching the main body to the stroller integrated into the design so as to attach the stroller platform to the members of the stroller frame, as a one-piece construction without the use of a crosspiece. FIG. 7A shows an exemplary embodiment of the invention as a single molded piece comprised of main body 70, clip necks 71 and clips 72. Necks 71 can function to join main body 70 and clips 72. Necks 71 can be made optional if clips 72 are integrated into main body 70. Necks 71 can be made with length to accommodate the stroller geometry if it is desirable or necessary to separate main body 70 from the vertical members of the stroller frame.

Clips 72 can function as the attachment mechanism of main body 70 to the stroller. Clips 72 can be made of a flexible material such as a plastic or can be made thin to allow spreading about, and then closing around and capture of members of the stroller frame. Through selection of appropriate materials and geometry of clips 72, the opening force can be designed to be sufficient to withstand accidental disengagement of the platform in regular use. Thus, this version of the invention can be easy to assemble and disassemble.

Clips 72 can be made of sufficient size and material to hold the weight of the child, or can be sized smaller if the invention can rely on the stroller's underbasket or other members of the stroller's frame to support the weight of the child.

Clips 72 can be sized to fit standard vertical bar sizes. Clips 72 can be sized slightly smaller than standard sizes to provide a tighter fit. Clips 72 can be oversized relative to standard sizes of stroller frame members and shims can be used to ensure a good fit. Making available shims of various thicknesses can allow for use with different sized stroller frame members. Suitable materials can include flexible materials such as rubbers, foams and neoprene.

FIG. 7B shows the top left corner of FIG. 7A modified by the addition of safety bolt 75 to modified clips 74. Safety bolt 75 comprises a safety mechanism to further ensure that there is no accidental disengagement of the platform in regular use. Safety bolt 75 can serve to provide adjustment for frames of varying thicknesses.

Further adaptation of the invention to universally fit many different models of strollers can be done by adding hinges. FIG. 7C shows the top left corner of FIG. 7A modified by the addition of hinge 76 to allow rotation of modified clip piece 78 relative to modified neck 77 permitting adjustment to the angle of the stroller frame member. If there is an underbasket or similar method of containing and transporting items with the stroller, hinges can also permit access to the contents of these containers without having to remove the stroller platform. In another instantiation modified neck 77 can be rotated by 90 degrees to allow better adjustment of the spacing of the clips to allow capture of frame members with different spacings. In another instantiation modified neck 77 can be rotated by an angle between 0 and 90 degrees to provide for some adjustment to both angle and spacing of the stroller frame members.

In another instantiation of the invention, the modified neck 77 is as it was in FIG. 7C and the invention can further comprise hinges to accommodate different sized spacing between the vertical members of the stroller. In FIG. 7D, the invention disclosed in FIG. 7C is further modified by the addition of hinge joint 79 to modified neck 77 of FIG. 7C. This additional joint adds an additional degree of freedom allowing for better reach and better capture of the stroller's frame. Hinge joint 79 can be a pin joint allowing for yaw rotation of clips to rotationally change the distance between the clips 72 or clips 74 or clips 78, whichever is being used.

To allow adjustment to angle and to spacing of the members of the stroller to which the platform connects, the hinges can be incorporated into one piece. This can be accomplished by making the hinge a ball joint. This can also be accomplished by having neck 73 or neck 77 of FIG. 7 constructed with an angle as bent piece 81 of FIG. 8. In FIG. 8, a side view of the stroller platform presents main body 80 with bent arm 81 connecting to clip 84, and further comprising hinge 82.

Figure 7:
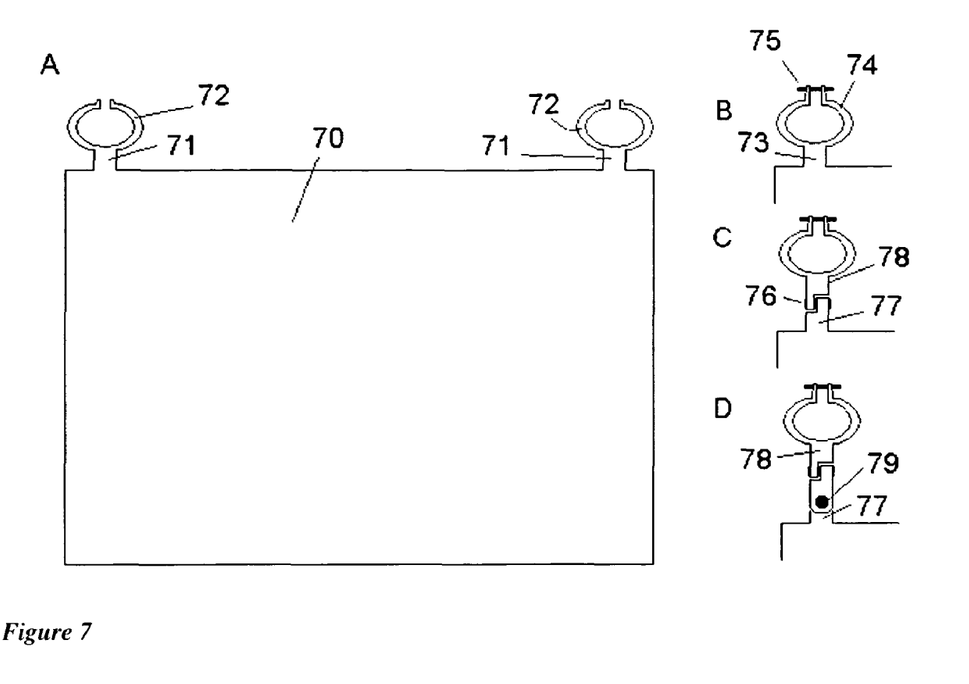
FIG. 7 shows top views of the stroller platform with integrated attachment mechanism, (A) as a single piece construction; (B) with additional bolts for additional safety; (C) with hinges for adjustment to the angle of the vertical frame members; and (D) with hinges for adjustment to the angle of the vertical frame members and to the spacing of the vertical frame members.
Figure 8:
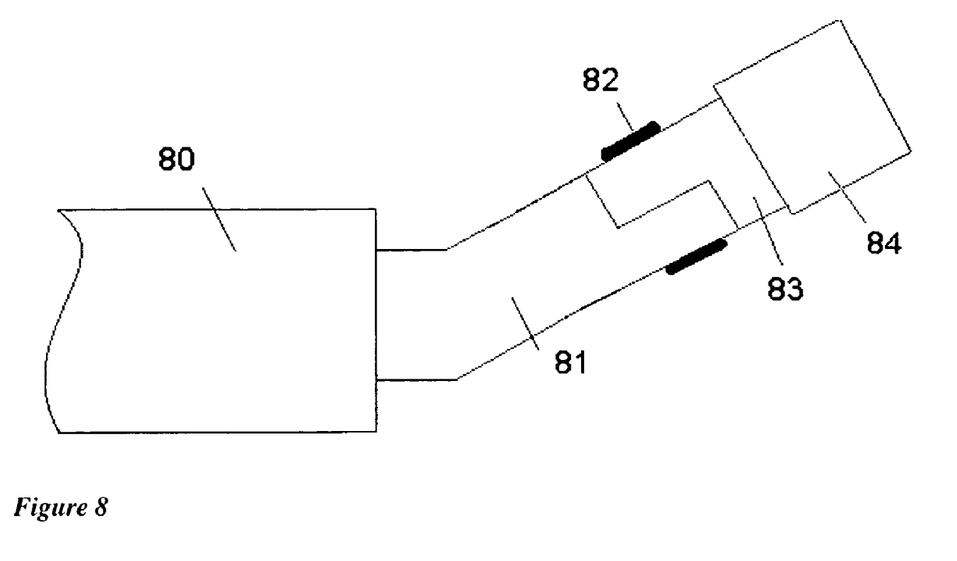
FIG. 8 shows a close-up view of a bent clip arm with hinge.

To adapt to specific brands of strollers and in particular to accommodate different configurations and relationships of the members in the frames of the stroller, neck 71, neck 73 and neck 77 of FIG. 7 and bent arm 81 of FIG. 8, can be made with horizontal and/or vertical bends to allow connection to members of the stroller that cannot be directly attached to in a straight line. The jog can take the form of one or more bends in one or more links. The bends will allow the clips to reach and attach to stroller members that are partially obscured, by fabric for example. The bends can be made to allow grips above and below the plane of the stroller platform main body.

The neck pieces and other modifications from FIG. 7 can further comprise a sliding mechanism to adjust the length of the neck and other modified pieces to allow attaching to many different stroller varieties.

Furthermore, a general stroller platform main body can be made for use with many types of strollers and specific neck and arm pieces made and used to attach and adapt to individual stroller types.

The invention is intended to be of simple construction and thereby easily manufactured and inexpensive to produce and sell. The crosspieces, and main bodies and sides of main bodies can be made using inexpensive, mass production processes including injection molding and vacuum forming. These parts are preferably shells with support structures including vertical ribs and honeycombing to save weight and material without sacrificing strength, but can also be solid parts. In another exemplary method of reducing weight for a solid body, the main body, cross-section and other such parts could consist of hollow shells with or without foam, cork or other lightweight cores. Preferably these materials are made from an injection moldable plastic such as one of the polyethylenes, polyamides or another engineered material with appropriate mechanical properties so as to resist breakage under the weight of the child.

What is claimed is:

1. In combination:
    A stroller comprising a structural frame wherein said structural frame comprises at least one vertical frame member connected to at least one horizontal frame member;
    a platform for the conveyance of an objects, said platform comprising a main body and a crosspiece;
    wherein said main body and said crosspiece connect by means of at least one fastening mechanism and form at least one hollow portion, wherein said at least one hollow portion receives said at least one vertical frame member and said at least one horizontal frame member of said stroller;
    wherein a bottom portion of said main body is supported by horizontal frame members of a stroller; and
    wherein a top portion of said crosspiece contacts said horizontal frame members when said platform receives and supports an object.

2. The platform of claim 1, wherein said at least one fastening mechanism includes at least one of pins, bolts, screws or receiving nuts.

3. The platform of claim 1, wherein the crosspiece comprises at least one of chains, belts, straps or ropes.

4. The platform of claim 1, wherein the crosspiece is received by one or more joining holes in said main body.

5. A method of conveying one or more objects utilizing, in combination:
    A stroller comprising a structural frame wherein said structural frame comprises at least one vertical frame member connected to at least one horizontal frame member;
    a platform for the conveyance of an objects, said platform comprising a main body and a crosspiece;
    wherein said main body and said crosspiece connect by means of at least one fastening mechanism and form at least one hollow portion, wherein said at least one hollow portion receives said at least one vertical frame member and said at least one horizontal frame member of said stroller;
    wherein a bottom portion of said main body is supported by horizontal frame members of a stroller; and
    wherein a top portion of said crosspiece contacts said horizontal frame members when said platform receives and supports an object.

6. The method of claim 5, wherein said main body rests upon an underbasket.

* * * * *